(12) United States Patent
Lee (10) Patent No.: US 11,037,052 B2
(45) Date of Patent: Jun. 15, 2021

(54) METHOD OF READING DATA FROM SYNAPSES OF A NEUROMORPHIC DEVICE (71) Applicant: SK hynix Inc., Icheon (KR)

(72) Inventor: Hyung-Dong Lee, Icheon (KR)

(73) Assignee: SK hynix Inc., Icheon (KR)

( * ) Notice: Subject to any disclaimer, the term of this patent is extended or adjusted under 35 U.S.C. 154(b) by 715 days.

(21) Appl. No.: 15/388,677

(22) Filed: Dec. 22, 2016

(65) Prior Publication Data

US 2017/0193355 A1 Jul. 6, 2017

Related U.S. Application Data (60) Provisional application No. 62/273,218, filed on Dec. 30, 2015.

(30) Foreign Application Priority Data

Oct. 4, 2016 (KR) .......................... 10-2016-0127527

(51) Int. Cl.
*G06N 3/063* (2006.01)
*G06N 3/04* (2006.01)

(52) U.S. Cl.
CPC .............. *G06N 3/063* (2013.01); *G06N 3/049* (2013.01)

(58) Field of Classification Search
CPC . H01L 45/04; H01L 27/2463; G11C 2213/79; G11C 13/0026; G11C 13/0028; G06N 3/049; G06N 3/063
See application file for complete search history.

(56) References Cited

U.S. PATENT DOCUMENTS

| 7,903,448 | B2* | 3/2011 | Oh | G11C 13/0007 365/148 |
| 2008/0266934 | A1* | 10/2008 | Yokoi | G11C 13/0004 365/148 |
| 2010/0223220 | A1* | 9/2010 | Modha | G06N 3/0635 706/33 |
| 2011/0119215 | A1* | 5/2011 | Elmegreen | G06N 3/0635 706/37 |
| 2014/0122402 | A1* | 5/2014 | Bichler | G06N 3/0635 706/27 |
| 2014/0129498 | A1* | 5/2014 | Bichler | G06N 3/063 706/25 |
| 2014/0269101 | A1* | 9/2014 | Tanzawa | G11C 16/3459 365/185.24 |
| 2014/0321197 | A1* | 10/2014 | Ninomiya | G11C 13/0069 365/148 |
| 2017/0017879 | A1* | 1/2017 | Kataeva | G06F 11/079 |

(Continued)

FOREIGN PATENT DOCUMENTS

KR 10-2016-0122531 A 10/2016

*Primary Examiner* — Kamran Afshar
*Assistant Examiner* — Marshall L Werner (57) ABSTRACT A method reads data from a synapse which includes a transistor and a variable resistor. The transistor has a gate electrode, a first electrode and a second electrode. The variable resistor has a first electrode connected to the second electrode of the transistor. The method includes applying a read voltage to the gate electrode of the transistor, applying a pre-synaptic voltage to the first electrode of the transistor, and applying a post-synaptic voltage to a second electrode of the variable resistor. The read voltage is lower than the threshold voltage of the transistor.

19 Claims, 8 Drawing Sheets (56) References Cited

U.S. PATENT DOCUMENTS

2017/0047513 A1* 2/2017 Rolandi ............. G11C 13/0014
2017/0083810 A1* 3/2017 Ielmini ................. G06N 3/063
2017/0243883 A1* 8/2017 Kobayashi ............. H01L 28/00

* cited by examiner

METHOD OF READING DATA FROM SYNAPSES OF A NEUROMORPHIC DEVICE

CROSS-REFERENCE TO RELATED APPLICATIONS

The present application claims priority to U.S. Provisional Patent Application No. 62/273,218, filed on Dec. 30, 2015, and Korean Patent Application No. 10-2016-0127527, filed on Oct. 4, 2016, which are incorporated herein by reference in their entirety.

BACKGROUND

1. Field

Exemplary embodiments of the present disclosure relate to a method of reading data from synapses of a neuromorphic device, and more particularly, to a method of reading data in a sub-threshold voltage region.

2. Description of the Related Art

Recently, much attention has been paid to neuromorphic technology using chips that mimic the human brain. A neuromorphic device based on the neuromorphic technology includes a plurality of pre-synaptic neurons, a plurality of post-synaptic neurons, and a plurality of synapses. The neuromorphic device outputs pulses or spikes having various levels, amplitudes, or times, according to learning states of the neuromorphic device. A synapse of a neuromorphic device may store multi-level data. For example, the synapse may store data corresponding to an intermediate data level between 1 and 0, depending on a learning level thereof, and also store a strong learning level or a weak learning level. Therefore, when data is read from a synapse, it is advantageous for output current values of different data levels to have a large difference therebetween, depending on resistance values of the synapse.

SUMMARY

Embodiments are directed to a method of reading data from a synapse of a neuromorphic device.

Embodiments are directed to a method of reading data from a synapse in a sub-threshold voltage region.

Embodiments are directed to a method of implementing an excitatory synapse and an inhibitory synapse in a reading mode.

In an embodiment, there is provided a method of reading data from a synapse which includes a transistor and a variable resistor. The transistor may have a gate electrode, a first electrode and a second electrode. The variable resistor may have a first electrode connected to the second electrode of the transistor. The method may include: applying a read voltage to the gate electrode of the transistor; applying a pre-synaptic voltage to the first electrode of the transistor; and applying a post-synaptic voltage to a second electrode of the variable resistor. The read voltage may be lower than the threshold voltage of the transistor.

The post-synaptic voltage may be substantially zero.

An absolute value of a difference between the read voltage and the post-synaptic voltage may be smaller than the threshold voltage.

The pre-synaptic voltage may be a positive (+) voltage.

The read voltage may be a positive voltage.

The pre-synaptic voltage may be greater than the read voltage.

An absolute value of a difference between the read voltage and the pre-synaptic voltage may be smaller than the threshold voltage.

The pre-synaptic voltage may be a negative (−) voltage.

The read voltage may be a negative voltage.

The pre-synaptic voltage may be lower than the read voltage.

In an embodiment, there is provided a method of reading data from a synapse which includes a transistor and a variable resistor. The transistor may have a gate electrode, a first electrode and a second electrode. The variable resistor may have a first electrode connected to the second electrode of the transistor. The method may include: applying a positive read voltage from a gating controller to the gate electrode of the transistor through a gating line, the read voltage being lower than a threshold voltage of the transistor; applying a positive pre-synaptic voltage from a pre-synaptic neuron to the first electrode of the transistor through a row line; and applying a post-synaptic voltage from a post-synaptic neuron to the second electrode of the variable resistor through a column line.

An absolute value of a difference between the read voltage and the post-synaptic voltage may be smaller than the threshold voltage.

The post-synaptic voltage may be substantially zero.

A difference between the pre-synaptic voltage and the post-synaptic voltage may be larger than the threshold voltage.

In an embodiment, there is a method of reading data from a synapse which includes a transistor and a variable resistor. The transistor may have a gate electrode, a first electrode and a second electrode. The variable resistor may have a first electrode connected to the second electrode of the transistor. The method may include: applying a read voltage from a gating controller to the gate electrode of the transistor through a gating line, the read voltage being lower than a threshold voltage of the transistor; applying a negative pre-synaptic voltage from a pre-synaptic neuron to the first electrode of the transistor through a row line; and applying a post-synaptic voltage from a post-synaptic neuron to a second electrode of the variable resistor through a column line.

An absolute value of a difference between the read voltage and the pre-synaptic voltage may be smaller than the threshold voltage.

The read voltage may be a positive voltage.

The read voltage may be a negative voltage.

The post-synaptic voltage may be substantially zero.

A difference between the pre-synaptic voltage and the post-synaptic voltage may be larger than the threshold voltage.

DETAILED DESCRIPTION

Various embodiments will be described below in more detail with reference to the accompanying drawings. The inventive concepts may, however, be embodied in different forms and should not be construed as limited to the embodiments set forth herein. Rather, these embodiments are provided so that this disclosure will be thorough and complete, and will fully convey the scope of the inventive concepts to those skilled in the art.

The terms used in this specification are used for describing exemplary embodiments without limiting the inventive concepts. The terms of a singular form may include plural forms unless referred to the contrary. The meaning of 'comprise' and 'comprising' used in the specification specifies a component, step, operation, and/or element but does not exclude other components, steps, operations, and/or elements.

When one element is referred to as being 'connected to' or 'coupled to' another element, it may indicate that the former element is directly connected or coupled to the latter element or another element is interposed therebetween. On the other hand, when one element is referred to as being 'directly connected to' or 'directly coupled to' another element, it may indicate that no element is interposed therebetween. Furthermore, 'and/or' includes each of described items and one or more combinations.

The terms such as 'below', 'beneath', 'lower', 'above' and 'upper', which are spatially relative terms, may be used to easily describe the correlation between one element or components and another element or other components as illustrated in the drawings. The spatially relative terms should be understood as terms including different directions of elements during use or operation, in addition to directions illustrated in the drawings. For example, when an element illustrated in the drawings is turned over, the element which is referred to as being 'below' or 'beneath' another element may be placed above another element.

Throughout the specification, like reference numerals refer to like elements. Therefore, although the same or similar reference numerals are not mentioned or described in the corresponding drawing, the reference numerals may be described with reference to other drawings. Furthermore, although elements are not represented by reference numerals, the elements may be described with reference to other drawings.

In this specification, 'potentiation', 'set', 'learning', and 'training' may be used as the same or similar terms, and 'depressing', 'reset', and 'initiation' may be used as the same or similar terms. For example, an operation of lowering resistance values of synapses may be exemplified as potentiation, setting, learning, or training, and an operation of raising the resistance values of synapses may be exemplified as depressing, resetting, or initiation. Furthermore, when a synapse is potentiated, set, or trained, a gradually increasing voltage/current may be outputted from the synapse because the conductivity of the synapse is increasing. When a synapse is depressed, reset, or initiated, a gradually decreasing voltage/current may be outputted from the synapse because the conductivity of the synapse is decreasing. For convenience of description, a data pattern, an electrical signal, a pulse, a spike, and a firing may be interpreted as having the same, similar, or a compatible meaning. Furthermore, a voltage and a current may be interpreted as having the same or a compatible meaning.

Figure 1A:
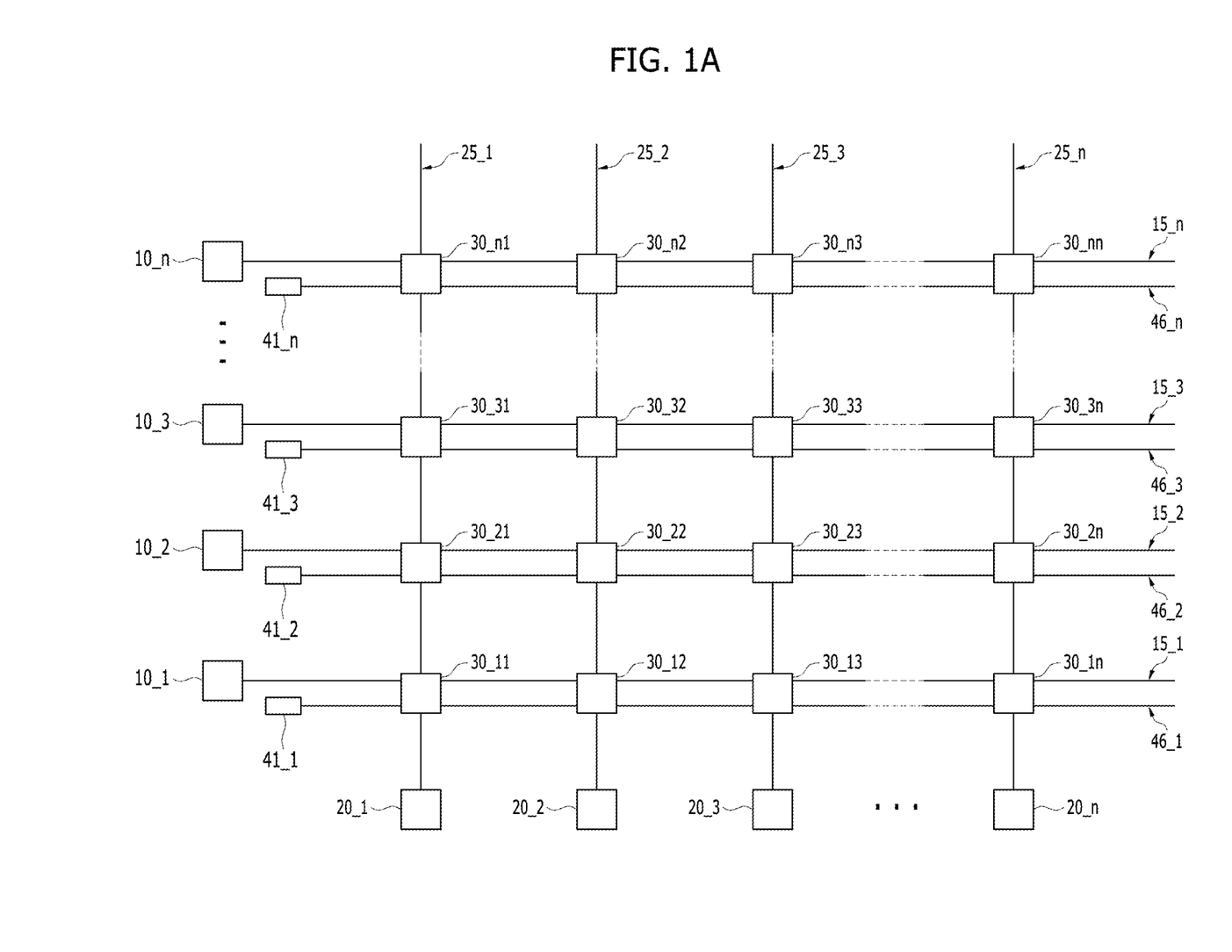
FIGS. 1A to 1C are block diagrams conceptually illustrating neuromorphic devices in accordance with various embodiments.
Figure 1B:
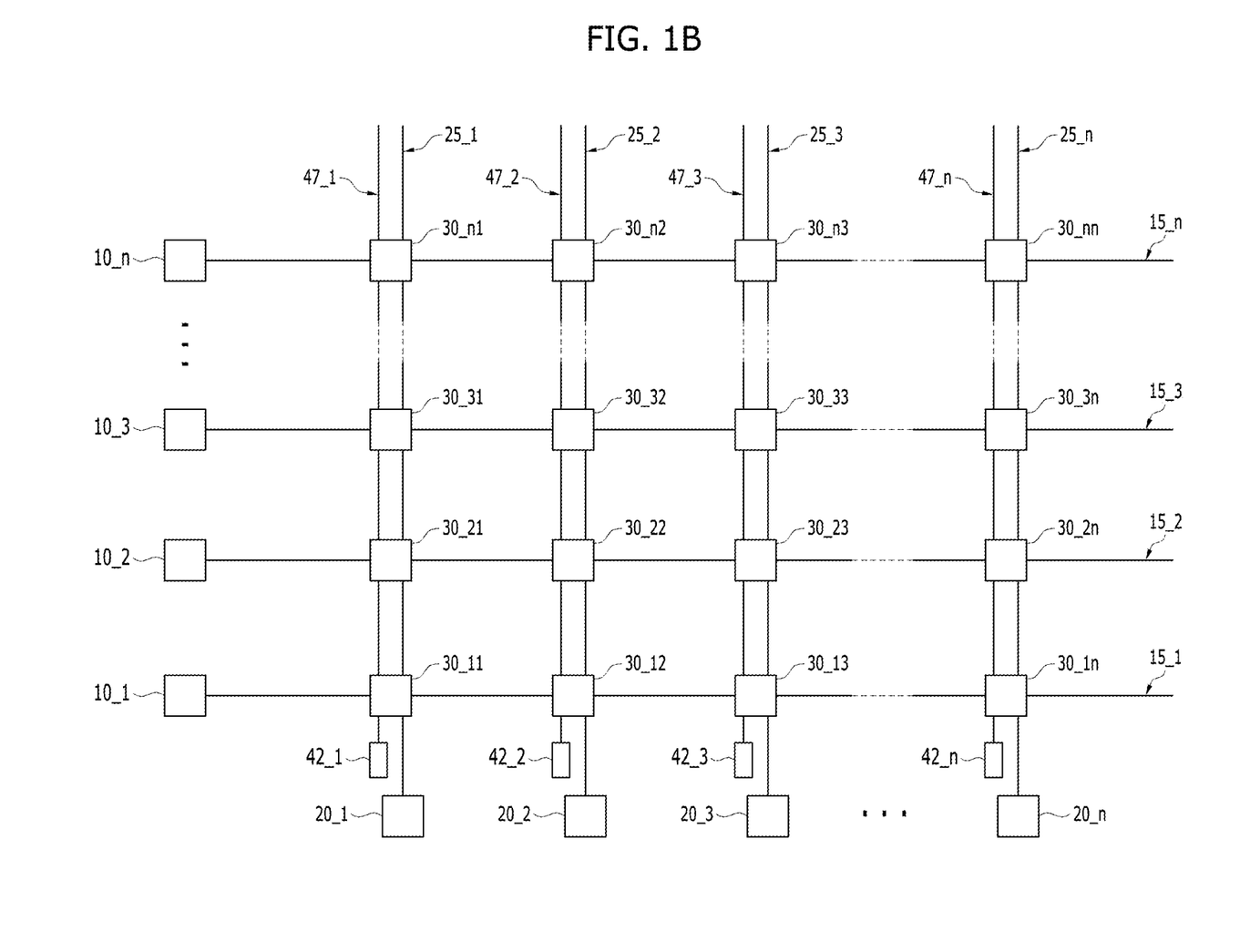
Figure 1C:
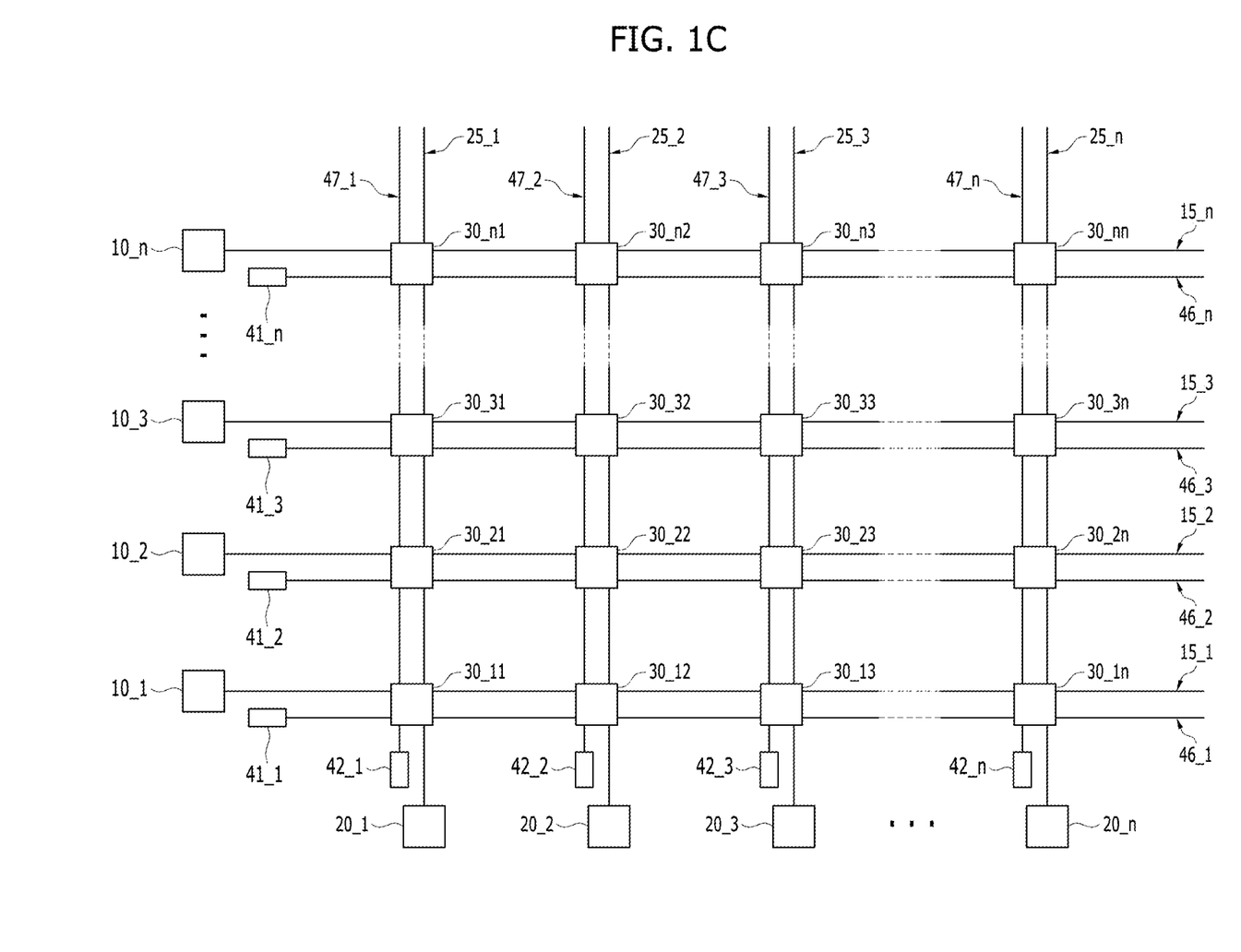

FIGS. 1A to 1C are block diagrams conceptually illustrating neuromorphic devices in accordance with various embodiments.

Referring to FIG. 1A, a neuromorphic device in accordance with an embodiment may include a plurality of pre-synaptic neurons $10\_1$ to $10\_n$, row lines $15\_1$ to $15\_n$, post-synaptic neurons $20\_1$ to $20\_n$, column lines $25\_1$ to $25\_n$, synapses $30\_11$ to $30\_nn$, row gating controllers $41\_1$ to $41\_n$, and row gating lines $46\_1$ to $46\_n$. The row lines $15\_1$ to $15\_n$ and the row gating lines $46\_1$ to $46\_n$ may be parallel to each other, n being a positive integer. In this embodiment, the number of pre-synaptic neurons $10\_1$ to $10\_n$ is the same as the number of post-synaptic neurons $20\_1$ to $20\_n$. However, in another embodiment, the number of pre-synaptic neurons is different from the number of post-synaptic neurons.

The pre-synaptic neurons $10\_1$ to $10\_n$ may transmit electrical signals to the synapses $30\_11$ to $30\_nn$ through the row lines $15\_1$ to $15\_n$ in a learning mode, a reset mode, or a reading mode.

The post-synaptic neurons $20\_1$ to $20\_n$ may transmit electrical signals to the synapses $30\_11$ to $30\_nn$ through the column lines $25\_1$ to $25\_n$ in the learning mode or the reset mode, and may receive electrical signals from the synapses $30\_11$ to $30\_nn$ through the column lines $25\_1$ to $25\_n$ in the reading mode.

Each of the row lines $15\_1$ to $15\_n$ may extend in a row direction from a corresponding one of the pre-synaptic neurons $10\_1$ to $10\_n$, and the row lines $15\_1$ to $15\_n$ may be electrically connected to the synapses $30\_11$ to $30\_nn$.

Each of the column lines $25\_1$ to $25\_n$ may extend in a column direction from a corresponding one of the post-synaptic neurons $20\_1$ to $20\_n$, and the column lines $25\_1$ to $25\_n$ may be electrically connected to the synapses $30\_11$ to $30\_nn$.

The row gating controllers $41\_1$ to $41\_n$ may provide gating signals to the synapses $30\_11$ to $30\_nn$ through the row gating lines $46\_1$ to $46\_n$.

Each of the row gating lines $46\_1$ to $46\_n$ may extend in the row direction from a corresponding one of the row gating controllers $41\_1$ to $41\_n$, and the row gating lines $46\_1$ to $46\_n$ may be electrically connected to the synapses $30\_11$ to $30\_nn$.

The synapses $30\_11$ to $30\_nn$ may be arranged at the respective intersections between the row lines $15\_1$ to $15\_n$ and the column lines $25\_1$ to $25\_n$. Thus, synapses sharing the same row line may also share the same row gating line. For example, the synapses $30\_11$ to $30\_1n$ sharing the row line $15\_1$ also share the row gating line $46\_1$.

Referring to FIG. 1B, a neuromorphic device in accordance with another embodiment may include a plurality of pre-synaptic neurons 10_1 to 10_n, row lines 15_1 to 15_n, post-synaptic neurons 20_1 to 20_n, column lines 25_1 to 25_n, synapses 30_11 to 30_nn, column gating controllers 42_1 to 42_n, and column gating lines 47_1 to 47_n. The column gating controllers 42_1 to 42_n may provide gating signals to the synapses 30_11 to 30_nn through the column gating lines 47_1 to 47_n. Each of the column gating lines 47_1 to 47_n may extend in the column direction from a corresponding one of the column gating controllers 42_1 to 42_n, and the column gating lines 47_1 to 47_n may be electrically connected to the synapses 30_11 to 30_nn. Synapses sharing the same column line may share the same column gating line. For example, the synapses 30_11 to 30_n1 sharing the column line 25_1 share the column gating line 47_1.

Referring to FIG. 1C, a neuromorphic device in accordance with still another embodiment may include a plurality of pre-synaptic neurons 10_1 to 10_n, row lines 15_1 to 15_n, post-synaptic neurons 20_1 to 20_n, column lines 25_1 to 25_n, synapses 30_11 to 30_nn, row gating controllers 41_1 to 41_n, column gating controllers 42_1 to 42_n, row gating lines 46_1 to 46_n, and column gating lines 47_1 to 47_n. The row gating controllers 41_1 to 41_n may provide gating signals to the synapses 30_11 to 30_nn through the row gating lines 46_1 to 46_n, and the column gating controllers 42_1 to 42_n may provide gating signals to the synapses 30_11 to 30_nn through the column gating lines 47_1 to 47_n. Synapses sharing the same row line may share the same row gating line, and synapses sharing the same column line may share the same column gating line. That is, the synapses 30_11 to 30_nn may be electrically connected to the row lines 15_1 to 15_n, the column lines 25_1 to 25_n, the row gating lines 46_1 to 46_n, and the column gating lines 47_1 to 47_n, according to their arrangements. In other words, each of the synapses 30_11 to 30_nn may be electrically connected to one row line, one column line, one row gating line, and one column gating line that are electrically connected thereto.

Figure 2:
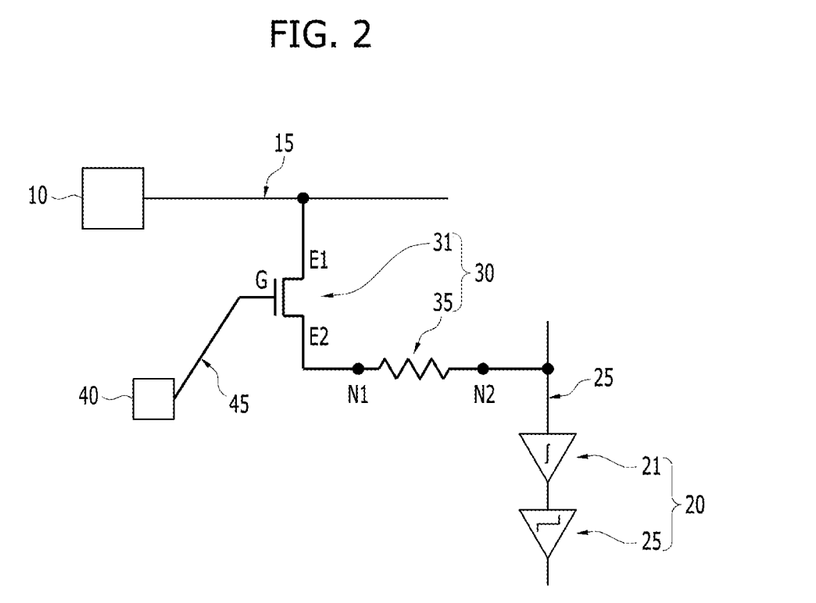
FIG. 2 is a detailed block diagram of a neuromorphic device in accordance with an embodiment.

FIG. 2 is a detailed block diagram of a neuromorphic device in accordance with an embodiment.

Referring to FIG. 2, a synapse 30 may include a transistor 31 and a memristor 35, and a post-synaptic neuron 20 may include an integrator 21 and a comparator 25. The memristor 35 may include a variable resistor.

The transistor 31 of the synapse 30 may have a gate electrode G electrically connected to a gating controller 40 through a gating line 45, a first electrode E1 electrically connected to a pre-synaptic neuron 10 through a row line 15, and a second electrode E2 electrically connected to a first node N1 of the memristor 35. The memristor 35 may further include a second node N2 electrically connected to the post-synaptic neuron 20 through a column line 25.

The integrator 21 of the post-synaptic neuron 20 may have an input terminal electrically connected to the second node N2 of the memristor 35 through the column line 25, and the comparator 25 may have an input terminal electrically connected to an output terminal of the integrator 21.

The first and second electrodes E1 and E2 of the transistor 31 each may be analyzed as a source or drain electrode, depending on a direction of a current flowing through the transistor 31. Thus, the first and second electrodes E1 and E2 each will be hereafter referred to as a source or drain electrode, depending on a circuit operation of the transistor 31.

Figure 3A:
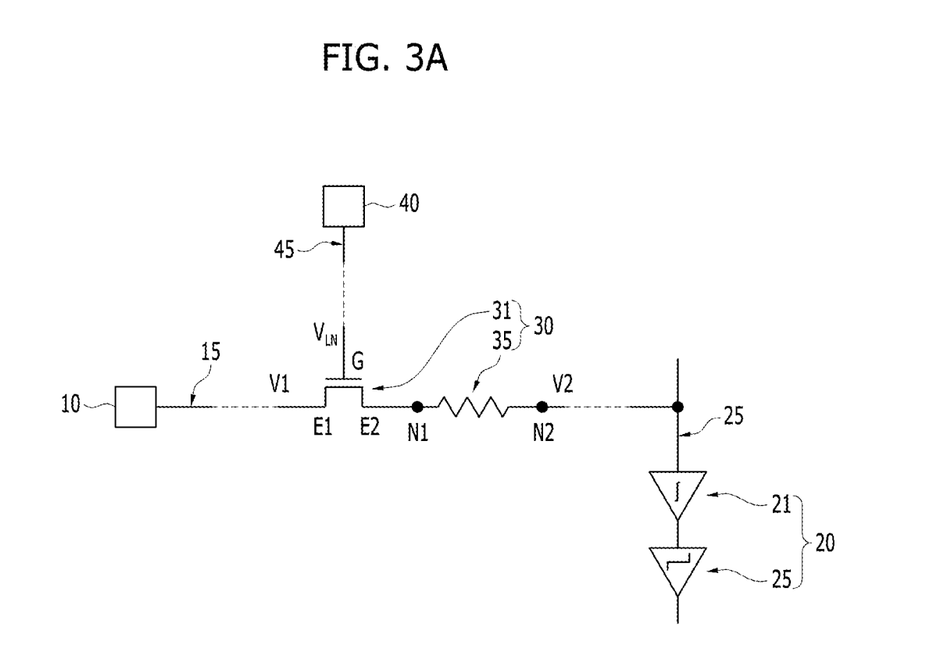
FIG. 3A is a conceptual block diagram for describing a method for training a synapse of the neuromorphic device of FIG. 2 in accordance with an embodiment.
Figure 3B:
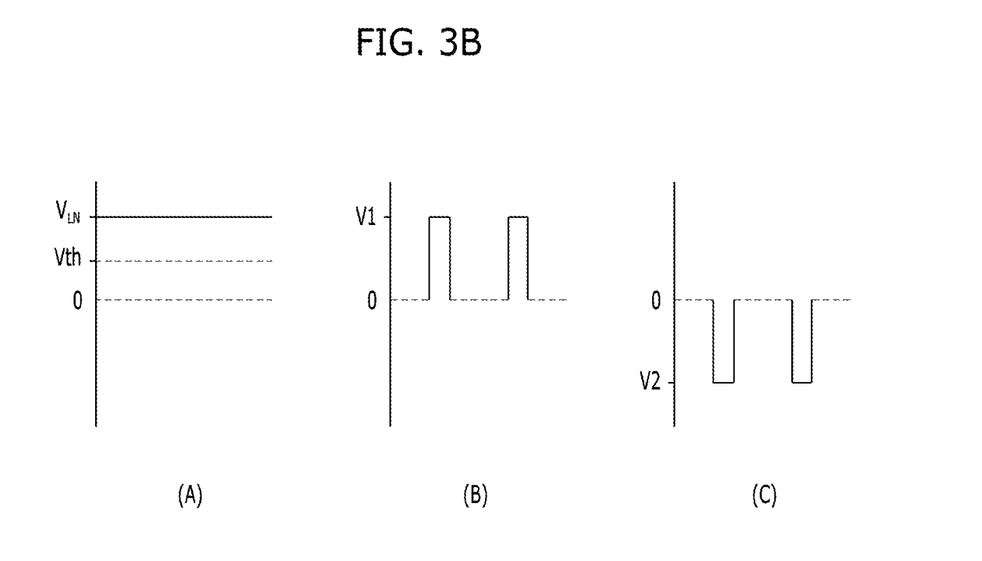
FIG. 3B is a graph conceptually illustrating a learning gate voltage, a learning pre-synaptic voltage, and a learning post-synaptic voltage used for training the synapse of the neuromorphic device shown in FIG. 3A.

FIG. 3A is a conceptual block diagram for describing a method for training the synapse 30 of the neuromorphic device of FIG. 2 in accordance with an embodiment. FIG. 3B is a graph conceptually illustrating a learning gate voltage $V_{LN}$, a learning pre-synaptic voltage V1, and a learning post-synaptic voltage V2 used for training the synapse 30.

Referring to FIGS. 3A and 3B, the method for training the synapse 30 of the neuromorphic device may include applying the learning gate voltage $V_{LN}$ to the gate electrode G of the transistor 31 in the synapse 30, applying the learning pre-synaptic voltage V1 to the first electrode E1 of the transistor 31, and applying the learning post-synaptic voltage V2 to the second nose N2 of the memristor 35 in the synapse 30.

As illustrated in FIG. 3B, the learning gate voltage $V_{LN}$ may be greater than a threshold voltage Vth of the transistor 31 ($V_{LN}$>Vth). The learning pre-synaptic voltage V1 may include a plurality of pulses corresponding to a positive (+) voltage. The learning post-synaptic voltage V2 may include a plurality of pulses corresponding to a negative (−) voltage. Thus, a gate-source voltage Vgs for turning on the transistor 31, that is, a voltage between the gate electrode G and the second electrode E2 of the transistor 31 ($V_{LN}$−V2), may be sufficiently greater than the threshold voltage Vth of the transistor 31, so that the transistor 31 may be sufficiently turned on when the gate-source voltage Vgs is applied.

A difference between the learning pre-synaptic voltage V1 and the learning post-synaptic voltage V2 may be large enough to lower or raise a resistance value of the memristor 35 in the synapse 30. For example, the difference between the learning pre-synaptic voltage V1 and the learning post-synaptic voltage V2 may be greater than a set voltage Vset or a reset voltage Vreset. The set voltage Vset and the reset voltage Vreset may lower or raise the resistance value of the memristor 35 in the synapse 30.

In some embodiments, the learning post-synaptic voltage V2 may have a 0 (zero) or a positive (+) voltage level. Even in this case, however, the gate-source voltage Vgs of the transistor 31 should be sufficiently greater than the threshold voltage Vth, in order to change the resistance value of the memristor 35 in the synapse 30.

In a learning mode, when an electrical signal that has passed through the memristor 35 in the synapse 30 is integrated by the integrator 21 of the post-synaptic neuron 20 and the integrated electrical signal has a greater voltage than a reference voltage of the comparator 25, an electrical signal may be outputted from the comparator 25. That is, the post-synaptic neuron 20 may be fired. When the post-synaptic neuron 20 is fired, the learning mode may be ended.

Figure 4A:
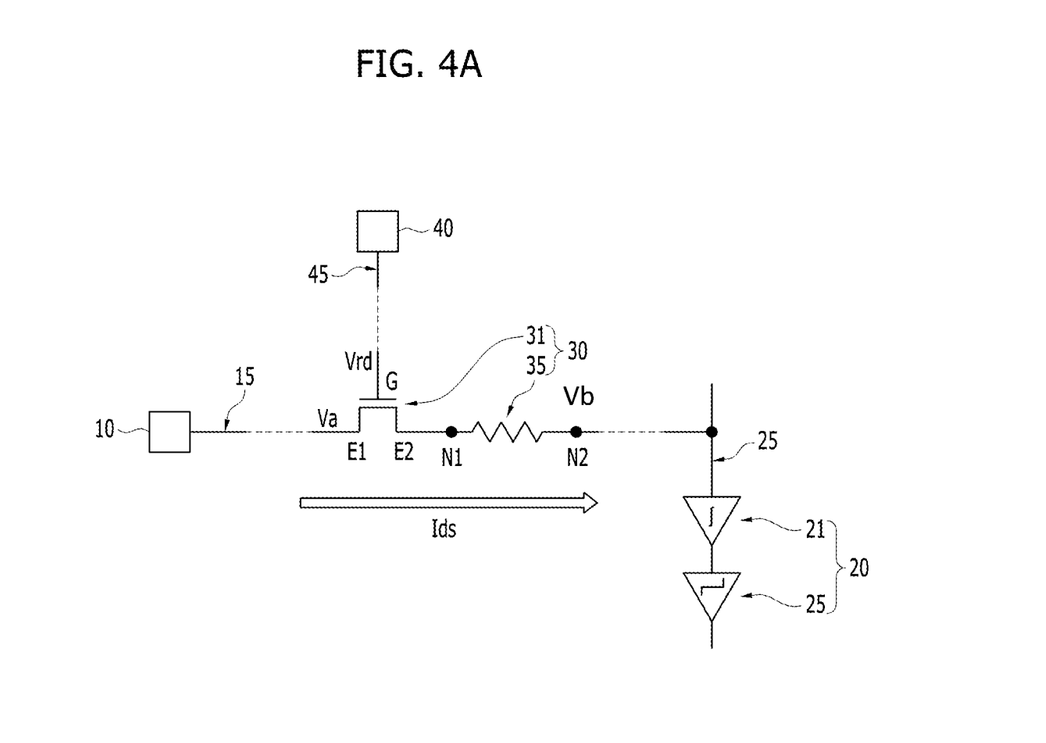
FIGS. 4A and 5A are conceptual block diagrams for describing a method for reading a data pattern learned by the synapse of the neuromorphic devices shown in FIG. 2 in accordance with embodiments.
Figure 4B:
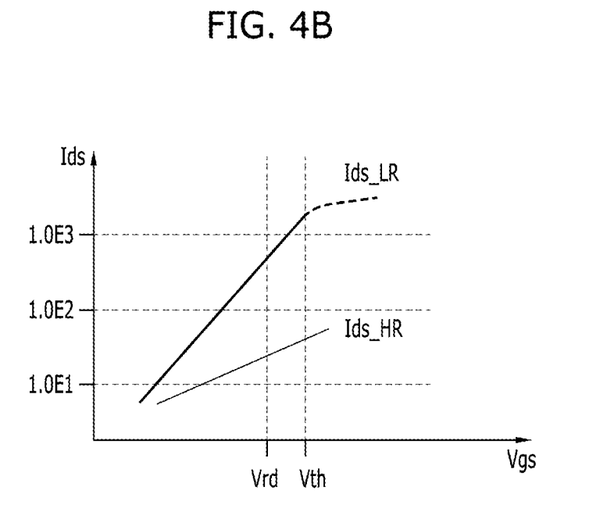
FIGS. 4B and 5B are graphs conceptually illustrating currents flowing through the synapse of FIG. 2 when the methods shown in FIGS. 4A and 5A are performed, respectively.

FIG. 4A is a conceptual block diagram for describing a method for reading a data pattern learned (stored) by the synapse 30 of the neuromorphic device of FIG. 2 in accordance with an embodiment, and FIG. 4B is a graph conceptually illustrating a current flowing through the synapse 30 in the reading mode. For example, in the reading mode, a current flowing from the synapse 30 operating in an excitatory synapse state to the post-synaptic neuron 20 increases. In FIG. 4A, an arrow indicates a current flow direction.

Referring to FIG. 4A, the method of reading the data pattern learned (stored) by the synapse 30 of the neuromorphic device may include applying a read voltage Vrd to the gate electrode G of the transistor 31 through the gating line 45 from the gating controller 40, applying a pre-synaptic voltage Va to the first electrode E1 of the transistor 31 through the row line 15 from the pre-synaptic neuron 10, and applying a post-synaptic voltage Vb to the second node N2 of the memristor 35 through the column line 25 from the post-synaptic neuron 20.

In this embodiment, the post-synaptic voltage Vb is substantially zero. Therefore, the post-synaptic neuron 20 may apply no voltage to the second node N2 of the memristor 35. The read voltage Vrd may be a positive voltage lower than the threshold voltage Vth of the transistor 31 and greater than the post-synaptic voltage Vb. The pre-synaptic voltage Va may be a positive voltage greater than the read voltage Vrd. Thus, the post-synaptic voltage Vb may be lower than the read voltage Vrd and the pre-synaptic voltage Va. In order to promote understanding of a technical idea of the inventive concepts, the following descriptions will be based on the presupposition that the post-synaptic voltage Vb is applied to the second electrode E2 of the transistor 31 via the memristor 35.

In the above-described process of applying the voltage, since an absolute value of a difference between the read voltage Vrd and the post-synaptic voltage Vb, that is, an absolute value of the gate-source voltage Vgs of the transistor 31, is smaller than the threshold voltage Vth of the transistor 31 (|Vgs|<Vth), the transistor 31 may be turned off. However, since a difference between the pre-synaptic voltage Va and the post-synaptic voltage Vb, that is, a drain-source voltage Vds of the transistor 31, is larger than the threshold voltage Vth of the transistor 31, a transistor current Ids may flow from the first electrode E1 to the second electrode E2 in the transistor 31. As a result, the current supplied to the post-synaptic neuron 20 through the column line 25 may increase when the synapse 30 operates in the excitatory synapse state.

For example, when the threshold voltage Vth of the transistor 31 is 0.7 V, the read voltage Vrd is 0.5 V, the pre-synaptic voltage Va is 1 V, and the post-synaptic voltage Vb is substantially zero, the gate-source voltage Vgs is 0.5V. Thus, the transistor 31 may be turned off, and a small transistor current Ids may flow from the first electrode E1 to the second electrode E2 of the transistor 31 due to a potential difference of 1 V between the pre-synaptic voltage Va and the post-synaptic voltage Vb.

The transistor current Ids is illustrated in the graph of FIG. 4B. Specifically, FIG. 4B illustrates the change of the transistor current Ids depending on the change in a difference between the read voltage Vrd and the post-synaptic voltage Vb, that is, the change of the gate-source voltage Vgs of the transistor 31. In FIG. 4B, a vertical axis is shown by a log scale. Since the post-synaptic voltage Vb is substantially zero, the gate-source voltage Vgs may be substantially equal to the gate voltage Vg that is the read voltage Vrd (Vrd−Vb=Vgs=Vg).

Referring to FIG. 4B, the transistor current Ids exhibits a large difference between resistance states of the memristor 35 when the read voltage Vrd or the gate-source voltage Vgs is lower than the threshold voltage Vth of the transistor 31. Experimentally, the transistor current Ids is changed in an exponential manner with respect to the gate-source voltage Vgs when the read voltage Vrd or the gate-source voltage Vgs is lower than the threshold voltage Vth of the transistor 31.

$$I_{D\_subth} = I_{D0} \cdot e^{\frac{V_{gs}}{n k_B T}}$$

where $I_{D\_subth}$ represents a transistor current when the gate-source voltage Vgs is lower than the threshold voltage Vth of the transistor, $I_{D0}$ is a dark saturation current (a leakage current at no-light), n is an ideal factor (depending on a fabricating process and semiconductor materials, the ideal n is 1), $k_B$ is Boltzmann constant, and T is absolute temperature.

Experimentally, when the gate-source voltage Vgs is lower than the threshold voltage Vth of the transistor 31, a change rate of the transistor current Ids is equal to or greater than 1.0E3 times of the Ids when the gate-source voltage Vgs is higher than the threshold voltage Vth of the transistor 31. In the present embodiment, since a resistance change of the memristor 35 is small, the transistor current Ids may be rapidly changed even though the gate-source voltage Vgs of the transistor 31 is slightly changed.

Specifically, when the read voltage Vrd is lower than the threshold voltage Vth of the transistor 31 under the presupposition that the post-synaptic voltage Vb is zero, the transistor current Ids may exhibit a large difference between the resistance states of the memristor 35. For example, a transistor current Ids_LR when the memristor 35 has a low resistance state may be at least hundreds of times greater than a transistor current Ids_HR when the memristor 35 has a high resistance state. That is, a current difference between the learning states of the memristor 35 is significantly large. Thus, when the read voltage Vrd, i.e., the gate voltage Vg, which is lower than the threshold voltage Vth, is applied, a data pattern stored in the synapse 30 may be easily recognized. That is, it is possible to easily determine whether the synapse 30 is trained or not.

Figure 5A:
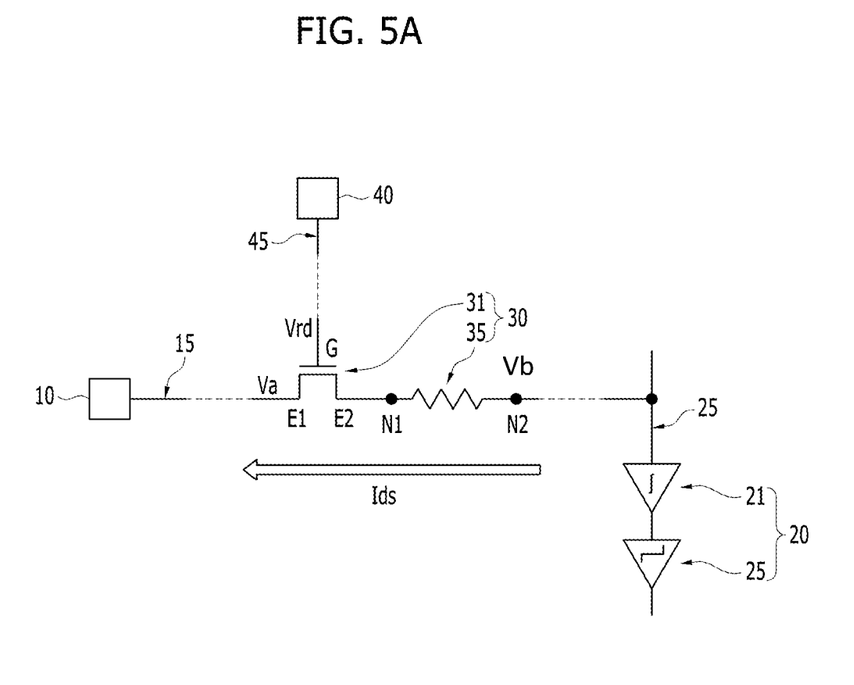
Figure 5B:
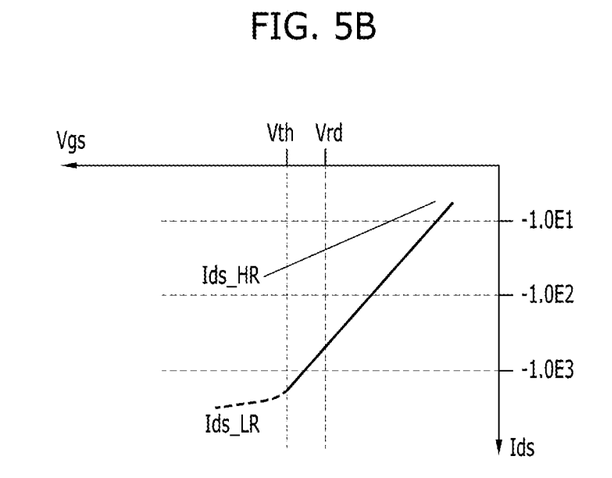

FIG. 5A is a conceptual block diagram for describing a method for reading a data pattern learned (stored) by the synapse 30 of the neuromorphic device of FIG. 2 in accordance with an embodiment, and FIG. 5B is a graph conceptually illustrating a current flowing through the synapse 30 in the reading mode. For example, in the reading mode, a current flowing from the synapse 30 that operates in an inhibitory synapse state to the post-synaptic neuron 20 decreases. In FIG. 5A, an arrow indicates a current flow direction.

Referring to FIG. 5A, the method of reading a data pattern learned (stored) by the synapse 30 of the neuromorphic device in accordance with the present embodiment may include applying a read voltage Vrd to the gate electrode G of the transistor 31 in the synapse 30 through the gating line 45 from the gating controller 40, applying a pre-synaptic voltage Va to the first electrode E1 of the transistor 31 through the row line 15 from the pre-synaptic neuron 10, and applying a post-synaptic voltage Vb to the second node N2 of the memristor 35 through the column line 25 from the post-synaptic neuron 20.

In this embodiment, the post-synaptic voltage Vb is substantially zero. The pre-synaptic voltage Va may be a voltage lower than the read voltage Vrd and the post-synaptic voltage Vb. For example, the pre-synaptic voltage Va may be a negative voltage. The read voltage Vrd may be a positive or negative voltage and may be lower than the threshold voltage Vth of the transistor 31. For example, although the read voltage Vrd is a negative voltage, a voltage difference between the gate electrode G and the first electrode E1 of the transistor 31, that is, the gate-source voltage Vgs, may correspond to a positive voltage because the pre-synaptic voltage Va is lower than the read voltage Vrd. The difference between the read voltage Vrd and the pre-synaptic voltage Va, that is, an absolute value of the gate-source voltage Vgs of the transistor 31, may be smaller than the threshold voltage Vth of the transistor 31 (|Vgs|<Vth). Thus, the transistor 31 may be turned off. However, since an absolute value of a difference between the pre-synaptic voltage Va and the post-synaptic voltage Vb, that is, the drain-source voltage Vds, is larger than the threshold voltage Vth, the transistor current Ids may flow from the second electrode E2 to the first electrode E1 of the transistor 31. As a result, a current supplied to the post-synaptic neuron 20 through the column line 25 may decrease when the synapse 30 operates in the inhibitory synapse state.

For example, when the threshold voltage Vth of the transistor 31 is 0.7 V, the read voltage Vrd is 0.5 V, the pre-synaptic voltage Va is −1.0 V, and the post-synaptic voltage Vb is substantially zero, the absolute value of the gate-source voltage Vgs (Vrd−Vb) is 0.5 V. Thus, the transistor 31 may be turned off, and a small transistor current Ids may flow from the second electrode E2 to the first electrode E1 of the transistor 31 due to a potential difference of 1.0 V between the post-synaptic voltage Vb and the pre-synaptic voltage Va. In some embodiments, when the threshold voltage Vth of the transistor 31 is 0.7V, the read voltage Vrd is −0.5V, the pre-synaptic voltage Va is −1.0V, and the post-synaptic voltage Vb is substantially zero, the absolute value of the gate-source voltage Vgs is 0.5V. (The source electrode and the drain electrode are interchanged according to a current flow direction.) Thus, the transistor 31 may be turned off, and a small transistor current Ids may flow from the second electrode E2 to the first electrode E1 in the transistor 31 due to a potential difference of 1.0V between the post-synaptic voltage Vb and the pre-synaptic voltage Va. In the various embodiments, a technical idea of the inventive concepts may be implemented in a region where the absolute value of the gate-source voltage Vgs is smaller than the threshold voltage Vth (|Vgs|<Vth).

The transistor current Ids is illustrated in the graph of FIG. 5B. Specifically, FIG. 5B illustrates a change of the transistor current Ids depending on a change in a difference between the read voltage Vrd and the post-synaptic voltage Vb, that is, the change of the gate-source voltage Vgs of the transistor 31. Since the post-synaptic voltage Vb is substantially zero, the gate-source voltage Vgs may be a negative voltage.

Referring to FIG. 5B, the transistor current Ids exhibits a large difference between the resistance states of the memristor 35 when an absolute value of the read voltage Vrd or the gate-source voltage Vgs is smaller than an absolute value of the threshold voltage Vth of the transistor 31. In FIG. 5B, since the gate-source voltage Vgs is a difference between the read voltage Vrd and the pre-synaptic voltage Va, the gate-source voltage Vgs has a negative value. Furthermore, since the transistor current Ids flows from the second electrode E2 to the first electrode E1, the transistor current Ids has a negative value.

Specifically, the transistor current Ids may exhibit a large difference between the resistance states of the memristor 35. For example, the transistor current Ids_LR when the memristor 35 has a low resistance state may be at least hundreds of times lower than the transistor current Ids_HR when the memristor 35 has a high resistance state.

Thus, when the read voltage Vrd, i.e., the gate voltage Vg, which is lower than the threshold voltage Vth, is applied, the data pattern stored in the synapse 30 may be easily recognized. That is, it is possible to easily determine whether the synapse 30 is trained or not.

Figure 6:
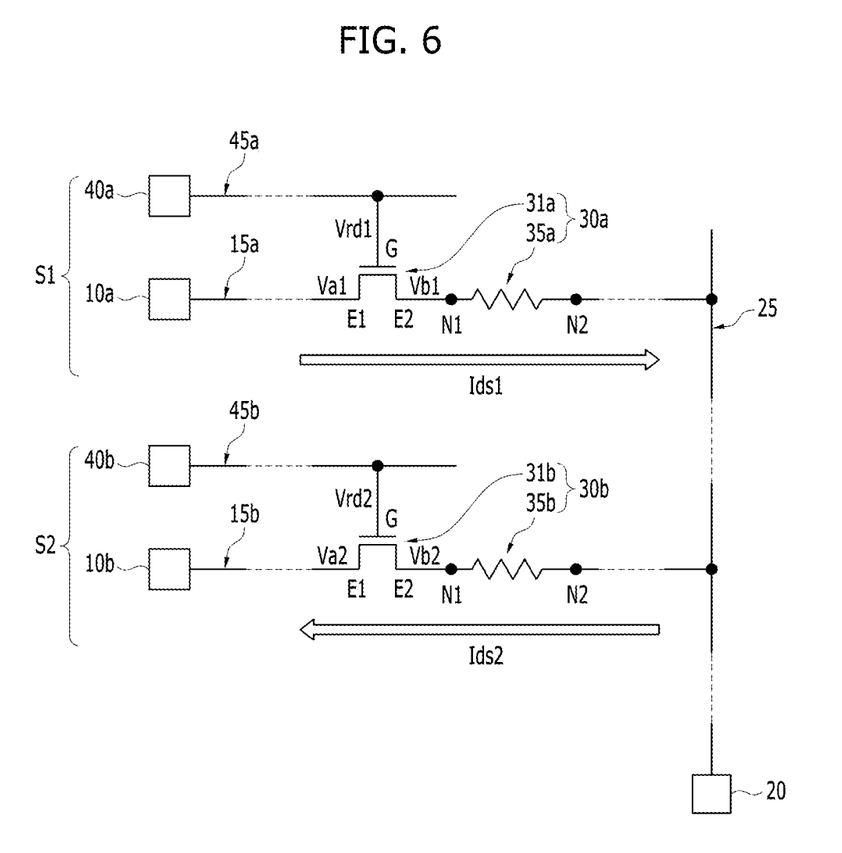
FIG. 6 is a conceptual block diagram describing a method for reading data patterns learned by synapses of a neuromorphic device in accordance with an embodiment.

FIG. 6 is a conceptual block diagram illustrating a method for reading data patterns learned (stored) by first and second synapses 30a and 30b of a neuromorphic device in accordance with an embodiment. For example, FIG. 6 illustrates a configuration in which the first synapse 30a and the second synapse 30b operate at the same time. Referring to FIG. 6, a first synapse system S1 may perform an excitatory synapse operation when a second synapse system S2 performs an inhibitory synapse operation.

Specifically, in the first synapse system S1, a first read voltage Vrd1 may be applied to a gate electrode G of a first transistor 31a in the first synapse 30a through a first gating line 45a from a first gating controller 40a, a first pre-synaptic voltage Va1 may be applied to a first electrode E1 of the first transistor 31a through a first row line 15a from a first pre-synaptic neuron 10a, and a first post-synaptic voltage Vb1 may be applied to a second node of a first memristor 35a in the first synapse 30a or the second electrode E2 of the first transistor 31a through a column line 25 from a post-synaptic neuron 20.

Simultaneously, in the second synapse system S2, a second read voltage Vrd2 may be applied to a gate electrode G of a second transistor 31b in the second synapse 30b through a second gating line 45b from a second gating controller 40b, a second pre-synaptic voltage Va2 may be applied to a first electrode E1 of the second transistor 31b through a second row line 15b from a second pre-synaptic neuron 10b, and a second post-synaptic voltage Vb2 may be applied to a second node N2 of a second memristor 35b in the second synapse 30b or the second electrode E2 of the second transistor 31b through the column line 25 from the post-synaptic neuron 20.

The first read voltage Vrd1 may be a positive voltage lower than a threshold voltage Vth of the first transistor 31a so that the first transistor 31a is turned off. The second read voltage Vrd2 may be a positive voltage lower than a threshold voltage Vth of the second transistor 31b or a negative voltage having an absolute value smaller than the threshold voltage Vth. In some embodiments, the second read voltage Vrd2 may be substantially zero. Thus, the second transistor 31b may be turned off. In some embodiments, the first read voltage Vrd1 and the second read voltage Vrd2 may be substantially equal to each other.

The first pre-synaptic voltage Va1 applied to the first electrode E1 of the first transistor 31a may be a positive voltage greater than the first read voltage Vrd1 and the threshold voltage Vth of the first transistor 31a. The second pre-synaptic voltage Va2 applied to the first electrode E1 of the second transistor 31b may be lower than the second read voltage Vrd2 and the threshold voltage Vth of the second transistor 31b. For example, the second pre-synaptic voltage Va2 may be a negative voltage.

In the first transistor 31a, a difference between the first read voltage Vrd1 and the first post-synaptic voltage Vb1, that is, an absolute value (|Vgs|) of a gate-source voltage Vgs, may be smaller than the threshold voltage Vth of the first transistor 31a (|Vgs|<Vth). In the second transistor 31b, a difference between the second read voltage Vrd2 and the second pre-synaptic voltage Va2, that is, an absolute value (|Vgs|) of a gate-source voltage Vgs, may be lower than the threshold voltage Vth of the second transistor 31b.

In the various embodiments, the threshold voltages Vth of the transistors 31, 31a, and 31b may be adjusted in various manners. For example, a threshold voltage Vth of an intrinsic silicon transistor is known as approximately 0.67 V, but an ion-implant amount in a well region, source/drain region, or channel stop region may be adjusted to raise or lower the threshold voltage Vth.

The second pre-synaptic voltage Va2 applied to the first electrode E1 of the second transistor 31b may be a negative voltage.

The first and second post-synaptic voltages Vb1 and Vb2 may be equal to each other. For example, the first and second post-synaptic voltages Vb1 and Vb2 may be substantially zero.

In the first synapse system S1, a first drain-source current Ids1 may flow from the first electrode E1 to the second electrode E2 of the first transistor 31a.

In the second synapse system S2, a second drain-source current Ids2 may flow from the second electrode E2 to the first electrode E1 of the second transistor 31b.

A detailed operation of the first synapse system S1 may be understood with reference to FIGS. 4A and 4B, and a detailed operation of the second synapse system S2 may be understood with reference to FIGS. 5A and 5B.

Figure 7:
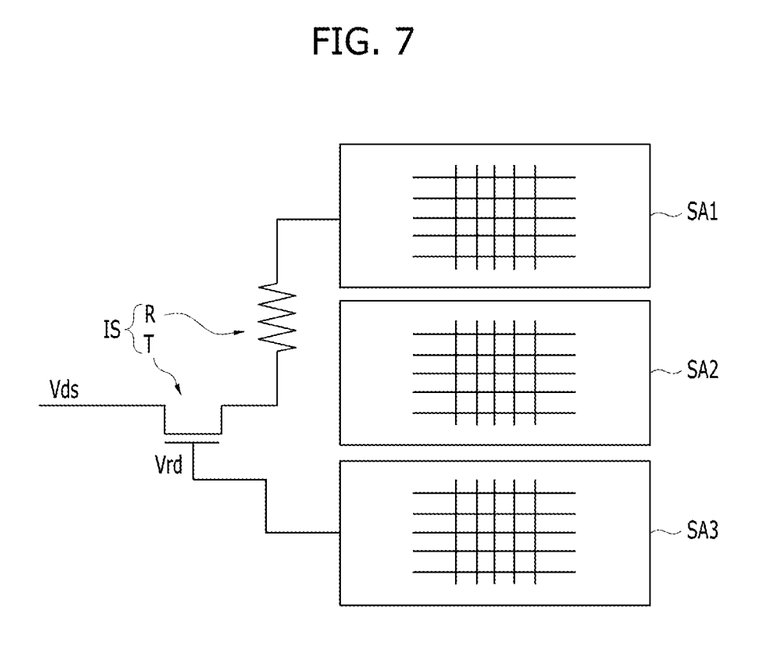
FIG. 7 is a block diagram conceptually illustrating a synapse array system of a neuromorphic device in accordance with an embodiment.

FIG. 7 is a block diagram conceptually illustrating an array system in accordance with an embodiment. Referring to FIG. 7, the array system in accordance with the present embodiment may include a plurality of synapse arrays SA1 to SA3 and an inter-array synapse IS. The plurality of synapse arrays SA1 to SA3 may be connected in series. For example, an output of the first synapse array SA1 may be used as an input of the second synapse array SA2, and an output of the second synapse array SA2 may be used as an input of the third synapse array SA3. The inter-array synapse IS may include an inter-array transistor T and an inter-array resistor R.

The inter-array synapse IS may perform an excitatory synapse operation or an inhibitory synapse operation. For example, when the output of the third synapse array SA3 is applied as a gate voltage of the transistor T, that is, a read voltage Vrd, and a drain-source voltage Vds is applied to an electrode of the inter-array transistor T from outside, the inter-array transistor T may increase or decrease a current flowing through the first synapse array SA1. That is, a learned data pattern of the first synapse array SA1 may be potentiated or depressed. The detailed operation of the inter-array synapse IS may be understood with reference to FIGS. 4A to 5B.

Figure 8:
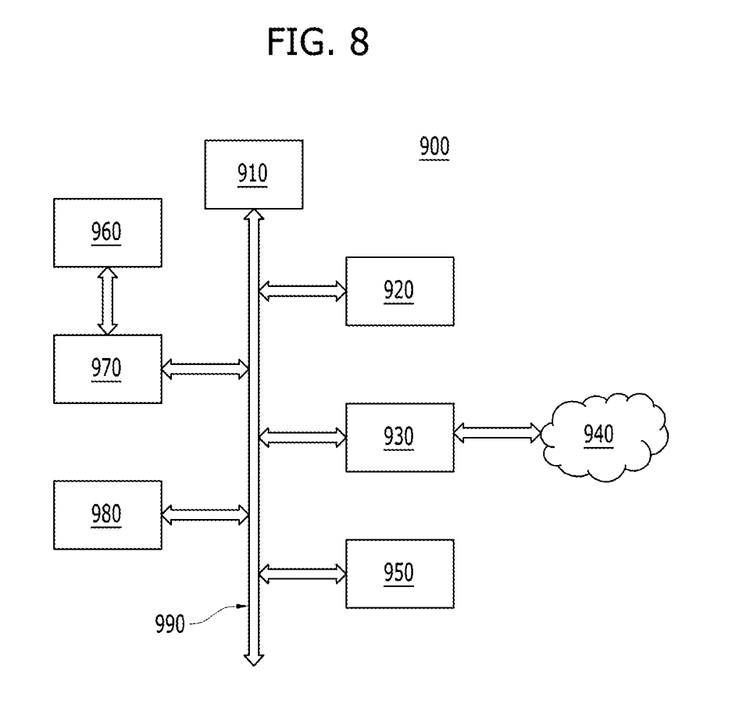
FIG. 8 is a block diagram conceptually illustrating a pattern recognition system in accordance with an embodiment.

FIG. 8 is a block diagram conceptually illustrating a pattern recognition system 900 in accordance with an embodiment. For example, the pattern recognition system 900 may include one of a speech recognition system, an image recognition system, a code recognition system, a signal recognition system, and a system for recognizing various patterns.

Referring to FIG. 8, the pattern recognition system 900 in accordance with the present embodiment may include a central processing unit (CPU) 910, a memory unit 920, a communication control unit 930, a network 940, an output unit 950, an input unit 960, an analog-digital converter 970, a neuromorphic unit 980, and a bus 990. The CPU 910 may generate and transmit various signals for a learning process to be performed by the neuromorphic unit 980, and perform a variety of processes and functions for recognizing patterns such as speech and images according to an output of the neuromorphic unit 980.

The CPU 910 may be connected to the memory unit 920, the communication control unit 930, the output unit 950, the ADC 970, and the neuromorphic unit 980 through the bus 990.

The memory unit 920 may store information in accordance with operations of the pattern recognition system 900. The memory unit 920 may include one or more of a volatile memory device such as DRAM or SRAM, a nonvolatile memory device such as PRAM, MRAM, ReRAM, or NAND flash memory, and a memory unit such as a HDD (Hard Disk Drive) or a SSD (Solid State Drive).

The communication control unit 930 may transmit and/or receive data such as a recognized speech and image to and/or from a communication control unit of another system through the network 940.

The output unit 950 may output the data such as the recognized speech and image using various methods. For example, the output unit 950 may include one or more of a speaker, a printer, a monitor, a display panel, a beam projector, a hologrammer, and so on.

The input unit 960 may include one or more of a is microphone, a camera, a scanner, a touch pad, a keyboard, a mouse, a mouse pen, a sensor, and so on.

The ADC 970 may convert analog data transmitted from the input unit 960 into digital data.

The neuromorphic unit 980 may perform learning and recognition using the data transmitted from the ADC 970, and output data corresponding to a recognized pattern. The neuromorphic unit 980 may perform the operations in accordance with the various embodiments.

In accordance with the present embodiments, since there is enlarged difference between currents read according to resistance states of a memristor, a data sensing margin may be improved.

Since there is enlarged difference between currents read according to resistance states of a memristor, correct data may be read.

Furthermore, an excitatory synapse operation and an inhibitory synapse operation may be independently performed at the same time.

Although various embodiments have been described for illustrative purposes, it will be apparent to those skilled in the art that various changes and modifications may be made without departing from the spirit and scope of the invention as defined in the following claims.

What is claimed is:

1. A method of reading data from a synapse which includes a transistor and a variable resistor, the transistor having a gate electrode, a first electrode, and a second electrode, the variable resistor having a first electrode connected to the second electrode of the transistor, the method comprising:
    applying a read voltage to the gate electrode of the transistor, the read voltage being a gate voltage for reading a data pattern learned by the synapse;
    applying a pre-synaptic voltage to the first electrode of the transistor; and
    applying a post-synaptic voltage to a second electrode of the variable resistor and to the second electrode of the transistor through the variable resistor,
    wherein an absolute value of a voltage difference between the read voltage and the post-synaptic voltage is smaller than a threshold voltage of the transistor, the threshold voltage being a minimum gate-to-source voltage to turn on the transistor, and
    wherein the voltage difference between the read voltage and the post-synaptic voltage indicates a voltage difference between the read voltage applied to the transistor and the post-synaptic voltage applied to the variable resistor in a read operation for reading the data pattern.

2. The method of claim 1, wherein the post-synaptic voltage is zero.

3. The method of claim 1, wherein the pre-synaptic voltage is a positive (+) voltage.

4. The method of claim 3, wherein the read voltage is a positive voltage.

5. The method of claim 4, wherein the pre-synaptic voltage is greater than the read voltage.

6. The method of claim 1, wherein an absolute value of a difference between the read voltage and the pre-synaptic voltage is smaller than the threshold voltage.

7. The method of claim 6, wherein the pre-synaptic voltage is a negative (−) voltage.

8. The method of claim 7, wherein the read voltage is a negative voltage.

9. The method of claim 8, wherein the pre-synaptic voltage is lower than the read voltage.

10. The method of claim 1, wherein an absolute value of a difference between the pre-synaptic voltage and the post-synaptic voltage is larger than the threshold voltage so that a current flows through the transistor.

11. A method of reading data from a synapse which includes a transistor and a variable resistor, the transistor having a gate electrode, a first electrode, and a second electrode, the variable resistor having a first electrode connected to the second electrode of the transistor, the method comprising:
applying a positive read voltage from a gating controller to the gate electrode of the transistor through a gating line, the read voltage being a gate voltage for reading a data pattern learned by the synapse;
applying a positive pre-synaptic voltage from a pre-synaptic neuron to the first electrode of the transistor through a row line; and
applying a post-synaptic voltage from a post-synaptic neuron to a second electrode of the variable resistor through a column line and to the second electrode of the transistor through the variable resistor,
wherein an absolute value of a voltage difference between the read voltage and the post-synaptic voltage is smaller than a threshold voltage of the transistor, the threshold voltage being a minimum gate-to-source voltage to turn on the transistor, and
wherein the voltage difference between the read voltage and the post-synaptic voltage indicates a voltage difference between the read voltage applied to the transistor and the post-synaptic voltage applied to the variable resistor in a read operation for reading the data pattern.

12. The method of claim 11, wherein the post-synaptic voltage is zero.

13. The method of claim 11, wherein a difference between the pre-synaptic voltage and the post-synaptic voltage is larger than the threshold voltage.

14. A method of reading data from a synapse which includes a transistor and a variable resistor, the transistor having a gate electrode, a first electrode, and a second electrode, the variable resistor having a first electrode connected to the second electrode of the transistor, the method comprising:
applying a read voltage from a gating controller to the gate electrode of the transistor through a gating line, the read voltage being a gate voltage for reading a data pattern learned by the synapse;
applying a negative pre-synaptic voltage from a pre-synaptic neuron to the first electrode of the transistor through a row line; and
applying a post-synaptic voltage from a post-synaptic neuron to a second electrode of the variable resistor through a column line and to the second electrode of the transistor through the variable resistor,
wherein an absolute value of a voltage difference between the read voltage and the post-synaptic voltage is smaller than a threshold voltage of the transistor, the threshold voltage being a minimum gate-to-source voltage to turn on the transistor, and
wherein the voltage difference between the read voltage and the post-synaptic voltage indicates a voltage difference between the read voltage applied to the transistor and the post-synaptic voltage applied to the variable resistor in a read operation for reading the data pattern.

15. The method of claim 14, wherein an absolute value of a difference between the read voltage and the pre-synaptic voltage is smaller than the threshold voltage.

16. The method of claim 15, wherein the read voltage is a positive voltage.

17. The method of claim 15, wherein the read voltage is a negative voltage.

18. The method of claim 15, wherein the post-synaptic voltage is zero.

19. The method of claim 15, wherein a difference between the pre-synaptic voltage and the post-synaptic voltage is larger than the threshold voltage.

* * * * *